J. C. EVANS.
VALVE.
APPLICATION FILED APR. 24, 1909.
941,314.
Patented Nov. 23, 1909.
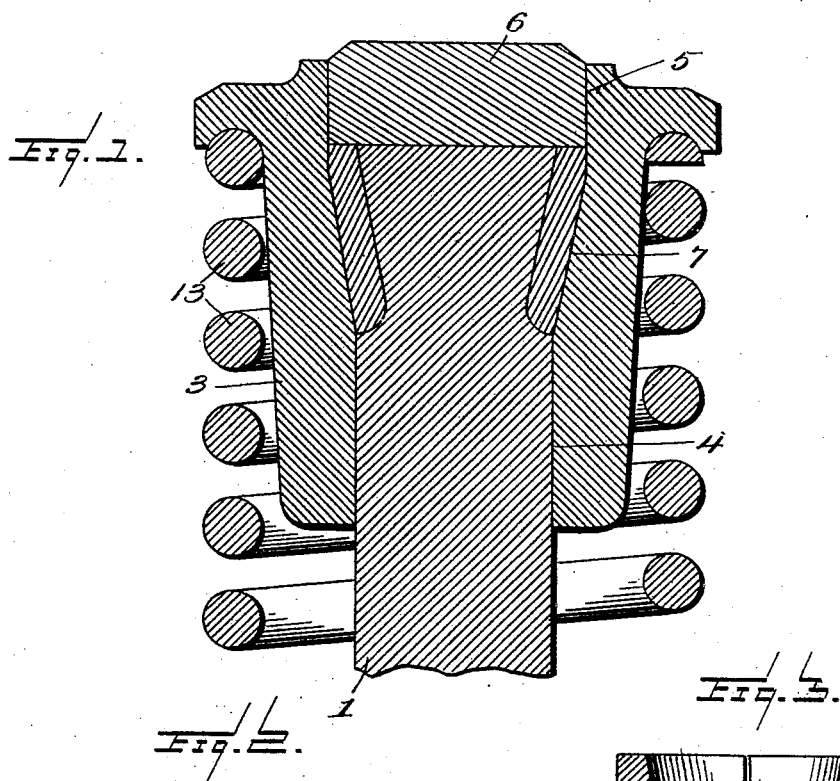
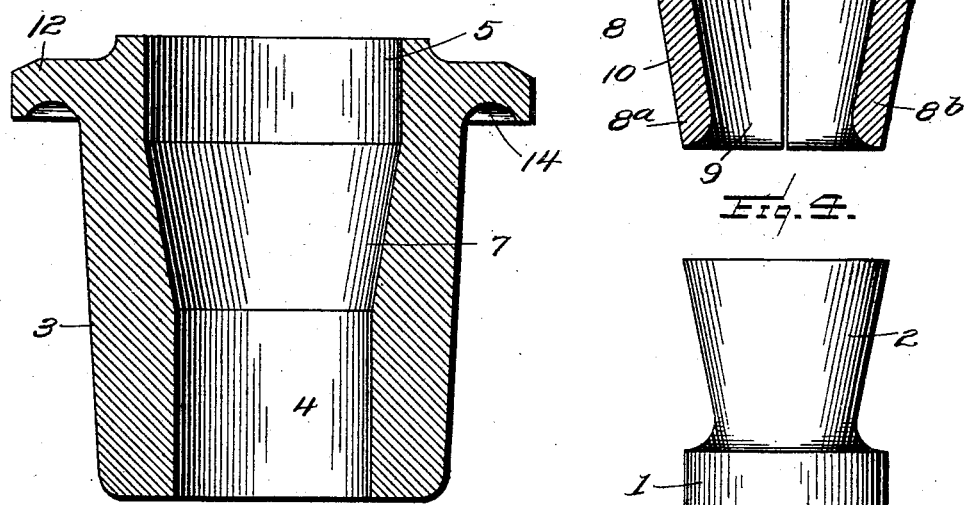
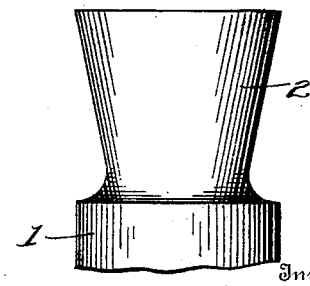
Inventor
Joshua C. Evans.
Witnesses
E. R. Ruppert.
J. F. Byrne.
By Victor J. Evans
Attorney

UNITED STATES PATENT OFFICE.

JOSHUA C. EVANS, OF YOUNGSTOWN, OHIO.

VALVE.

941,314.  Specification of Letters Patent.  Patented Nov. 23, 1909.

Application filed April 24, 1909. Serial No. 491,981.

*To all whom it may concern:*

Be it known that I, JOSHUA C. EVANS, citizen of the United States, residing at Youngstown, in the county of Mahoning and State of Ohio, have invented new and useful Improvements in Valves, of which the following is a specification.

My invention relates to improvements in suction or inlet valves of gasolene motors, and at present the nut of such a valve is threaded on to the stem. During the operation of the motor, the pressure on the nut is often such as to strip it from the stem, permitting the valve and stem to drop into the cylinder of the engine.

One object of my invention is the provision of a suction or inlet valve wherein the nut is secured to the stem against accidental displacement in an outward direction.

With the above and other objects in view, the invention consists in the construction, combination and arrangement of parts hereinafter fully described and claimed, and illustrated in the accompanying drawing, wherein:—

Figure 1 is a sectional view illustrating my invention. Fig. 2 is a detail sectional view of the nut. Fig. 3 is a detail sectional view of the key by which the nut is secured to the valve stem against accidental displacement, and Fig. 4 is a fragmentary portion of the outer end of the valve stem, illustrating the head through the medium of which the key is secured to the valve stem.

Referring to the drawing by reference numerals, 1 designates the stem of the suction or inlet valve of a gasolene motor. At a point near its outer end, the stem 1 is circumferentially reduced to provide an inverted conical head 2. The greatest transverse dimension of the head 2 is smaller than the transverse dimension of the stem 1, whereby to permit a nut 3 to be applied to and removed from the stem. The nut 3 is provided with an inner cylindrical bore 4 which snugly receives the stem 1, with an outer cylindrical bore 5 which is larger in diameter than the inner bore 4 and which receives a wear block 6, and with an intermediate tapered bore 7 which extends from the inner end of the inner bore 4 to the inner end of the outer bore 5 and which receives a key 8. The key 8 secures the nut 3 upon the stem 1 against accidental displacement, and it comprises two semi-cylindrical members 8ª and 8ᵇ which are applied to the head 2 of the stem 1. The inner sides 9 of the members of the key 8 are inclined to correspond with the inclination of and engage the side of the head 2, and the lower portions 10 of the outer sides of said members are inclined to correspond with the inclination of and engage the inner wall of the intermediate bore 7 of the nut 3. The upper portions 11 of the outer sides of the members of the key 8 are straight to correspond with and engage the wall of the outer bore 5 of the nut 3. As the outer bore 5 of the nut 3 is larger in diameter than the stem 1, the members of the key 8 may be readily and quickly applied to and removed from the head 2 in a manner that should be apparent. At a point adjacent its outer end, the nut 3 is provided with an annular flange 12 against the inner side of which the outer end of an expansible coiled spring 13 bears, the flange being provided with an annular recess 14 for the reception of said outer end of the spring.

When the suction or inlet valve is in applied position, the spring 13 exerts a constant tension on the flange 12 of the nut 3, such tension retaining the parts in the positions shown in Fig. 1 of the drawing. The wear block 6 engages the cam of the crank shaft and prevents the same from wearing the outer ends of the stem 1 and nut 3.

From the foregoing description, taken in connection with the accompanying drawing, it should be apparent that I provide a suction or inlet valve wherein the nut is secured to the stem against accidental displacement in an outward direction, one wherein the nut may be readily and quickly applied to and removed from the stem, and one which may be manufactured and sold at a comparatively low cost.

While I have described the method of operation of the invention, together with the apparatus which I now consider to be the best embodiment thereof, I desire to have it understood that the apparatus shown is merely illustrative and that such changes may be made when desired as are within the scope of the claims.

Having thus described the invention, what I claim as new is:—

1. In combination, a stem, a nut secured to the stem, and a wear block carried by the nut.

2. In combination, a stem provided with a conical head, a nut provided with a bore receiving the stem, and with a tapered bore, and a key inserted between the head and the wall of said tapered bore.

3. In combination, a stem provided with a conical head, a nut provided with an inner bore receiving the stem and with an outer bore and with a tapered intermediate bore, a key inserted between the head and the wall of said tapered bore, and a wear block inserted in the outer bore.

4. In combination, a stem provided with a head, a nut provided with an inner bore receiving the stem, said nut being provided with an outer bore larger than the inner bore and with an intermediate bore, and a key inserted between the head and the wall of said intermediate bore.

In testimony whereof I affix my signature in presence of two witnesses.

JOSHUA C. EVANS.

Witnesses:
T. EVANS,
W. C. BREWER.